US006847867B1

(12) United States Patent  
Elliott

(10) Patent No.: US 6,847,867 B1  
(45) Date of Patent: Jan. 25, 2005

(54) SATELLITE COMMUNICATION WITH LOW PROBABILITY OF DETECTION

(75) Inventor: Brig Barnum Elliott, Arlington, MA (US)

(73) Assignee: BBNT Solutions LLC, Cambridge, MA (US)

( * ) Notice: Subject to any disclaimer, the term of this patent is extended or adjusted under 35 U.S.C. 154(b) by 5 days.

(21) Appl. No.: 10/626,043

(22) Filed: Jul. 24, 2003

(51) Int. Cl.$^7$ ............................................... G06F 7/00
(52) U.S. Cl. ..................... 701/13; 701/213; 342/357.06; 342/357.09
(58) Field of Search ........................... 701/13, 213, 214, 701/215, 300; 342/357.06, 357.09; 455/12.1, 427

(56) References Cited

U.S. PATENT DOCUMENTS

| | | | | |
|---|---|---|---|---|
| 5,771,449 A | * | 6/1998 | Blasing et al. | 455/422.1 |
| 6,240,074 B1 | * | 5/2001 | Chandos et al. | 370/321 |
| 6,665,296 B1 | * | 12/2003 | Sturza et al. | 370/389 |

OTHER PUBLICATIONS

G. Minden et al.: "Routing in Space Based Internets," Information and Telecommunication Technology Center, Department of Electrical Engineering and Computer Science, University of Kansas, 3 pages.
Ram Ramanathan: "Making Ad Hoc Networks Density Adaptive," Internetwork Research Department, BBN Technologies, Cambridge, Massachusetts, 5 pages.
Ram Ramanathan: "Topology Control of Multihop Wireless Networks using Transmit Power Adjustment," Internetwork Research Department, BBN Technologies, Cambridge, Massachusetts 10 pages.
Zhuochuan Huang et al.: "Topology for Control Ad hoc Networks with Directional Antennas," Department of Computer and Information Sciences, University of Delaware, Newark, Delaware, 7 pages.
Nachum Shacham: "Protocols For Multi–Satellite Networks," SRI International, Menlo Park, California pp. 0501–0505.
Steve A. Borbash et al.: "Distributed Topology Control Algorithm for Multihop Wireless Networks," 6 pages.
Ram Ramanathan: "On the Performance of Ad Hoc Networks with Beamforming Antennas," Internetwork Research Department, BBN Technologies, Cambridge, Massachusetts, 11 pages.
"Keplerian Elements Tutorial," http://www.amsat.org/amsat/keps/kepmodel.html, Feb. 14, 2003, pp. 1–5.
Demitri Bertsekas, Robert Gallagher, *Data Networks*, $2^{nd}$ Edition, (1991), pp. 418–433.
"To Diode, DORIS, Doris Mission on SPOT 4," http://spot4.cnes.fr/spot4_gb/doris–di.ht, Oct. 28, 2002, pp. 1–6.
"BLISL Project: The Second Year," http://www.technion.ac.il/ASRI/projects/blis1/2ndyear.htm, pp. 1–9.
"SPOT 4 and ARTEMIS," Nov. 20, 2001, http://www.ukspace.com/press/press105.htm, pp. 1–3.

(List continued on next page.)

*Primary Examiner*—Gertrude A. Jeanglaude
(74) *Attorney, Agent, or Firm*—Ropes & Gray LLP

(57) ABSTRACT

Host satellites [120] in a satellite network [100] are implemented with a low probability of detection by third parties. Transmissions from the host satellites may be made via omni-directional antennas using relatively low signal power. These transmissions are received by a backbone satellite [110] in an orbit local to the host satellite. All transmissions to the host satellite are performed by another backbone satellite.

24 Claims, 9 Drawing Sheets

OTHER PUBLICATIONS

"Optical Ground Station has sights set on Artemis," European Space Agency, http://www.esa.int/export/esaSA/ESAJI7UM5JC_telecom_2.html, pp. 1–3.

NASDA Report: "Toward Inter–orbit Communications Experiments Using Optical Communications Technology," No. 85, Jul. 1999, http://www.nasda.go.jp/lib/nasda–news/1999/07/opt_e.html, pp. 1–2.

Optical Space Communications Group, http://www2.crl.go.jp/mt/bl62/index–e.html, 3 pages.

Thomas Ross Henderson: "Networking over Next–Generation Satellite Systems," University of California at Berkeley, Fall 1999, 157 pages.

Lloyd's satellite constellations—Overview, pp. 1–16, http://www.ee.surrey.ac.uk/Personal/L.Wood/constellations/overview.html.

LEO Satellite Constellations, pp. 1–2, http://www.geocities.com/CapeCanaveral/Launchpad/4857/leocont.html.

Internet Routing over LEO Satellite Constellations; Narvaez et al., pp. 1–2, http://citeseer.nj.nec.com/narvaez98internet.html.

Citations: iSatellite ATM Networks: A Survey; Akylidiz et al., 1 page, http://citeseer.nj.nec.com/context/1248250/0.

Topology Control of Multihop Wireless Networks using Transmit Power Adjustment; Ramanathan et al., pp. 1–2, http://citeseer.nj.nec.com/ramanathan00topology.html.

* cited by examiner

SATELLITE COMMUNICATION WITH LOW PROBABILITY OF DETECTION

BACKGROUND OF THE INVENTION

A. Field of the Invention

The present invention relates generally to satellite systems, and more particularly, to satellite networks having devices that communicate with a low probability of detection.

B. Description of Related Art

Communication satellites represent one of the most significant applications of space technology. Communication satellites can allow radio, television, and telephone transmissions to be sent live anywhere in the world. Before satellites, transmissions were difficult or impossible at long distances. The signals, which travel in straight lines, could not bend around the Earth to reach a destination far away. Because satellites are in orbit, the signals can be sent instantaneously into space and then redirected to their destination.

Communication satellites are often in geostationary orbit. At the orbital altitude of 35,800 kilometers, a geostationary satellite orbits the Earth in the same amount of time it takes the Earth to revolve once. From Earth, therefore, the satellite appears to be stationary. Communication satellites can also be in highly elliptical orbits. This type of orbit is roughly egg-shaped, with the Earth near the top of the egg. In a highly elliptical orbit, the satellite's velocity changes depending on where it is in its orbital path. When the satellite is in the part of its orbit that is close to the Earth, it moves faster because the Earth's gravitational pull is stronger.

A system of satellites may be linked together to form a satellite network. In such networks, data may be relayed between multiple satellites and/or ground based devices before reaching its final destination. In some satellite networks, it may be desirable for satellites in the network to communicate with a low probability of detection. That is, it should be difficult for anyone other than the satellite's operators to know that the satellite is present, let alone communicating.

Conventionally, communications having a low probability of detection (LPD) may be implemented using techniques that include highly directional antennas, low power transmissions, sporadic "burst" transmissions, direct sequence and/or frequency-hopping spreading codes, or "noise-like" communications such as ultra-wideband or so-called "featureless" or "chaotic" waveforms. Many of these techniques, however, are difficult to apply to satellite systems. For example, highly directional antennas require good satellite stabilization and/or elaborate antenna structures. Low-power transmissions work poorly when attempting to communicate from a location in space to one on earth. Burst transmissions are not suitable for satellites that need to communicate in a more or less continuous manner. The featureless or chaotic waveforms require sophisticated radios, which can be problematic to implement on satellites.

Thus, it would be desirable to implement satellite networks that more effectively make it difficult to detect satellites or communications between the satellites.

SUMMARY OF THE INVENTION

A satellite network includes host satellites that communicate with backbone satellites using techniques that give the host satellites a low probability of detection. The communication systems required by the host satellite are relatively basic systems that are typically present in the host satellites. Thus, existing host satellite hardware can be used, resulting in a cost effective and low-probability of detection system.

One aspect consistent with the present invention is directed to a satellite system that includes a first backbone satellite orbiting in a first orbit and a host satellite orbiting in the first orbit and configured to be physically near the first backbone satellite. The host satellite transmits information directly to the first backbone satellite via an omni-directional communication scheme and receives information from the first backbone satellite via a proxy satellite through which the information is relayed.

A second aspect of the invention is directed to a backbone satellite that includes a first input/output device that receives communications from a host satellite using omni-directional radio frequency links. A second input/output device transmits communications ultimately destined for the host satellite using directional communication links aimed at a second backbone satellite. The second backbone satellite relays the communications ultimately destined for the host satellite to the host satellite.

Yet another aspect consistent with the present invention is directed to a method of communicating with a low probability of detection in a satellite system. The method comprises receiving information, intended for a host satellite, at a first backbone satellite that is located proximate to and in a same orbit as the host satellite. The method further includes forwarding the information to the host satellite via a second backbone satellite that is in an orbit different from the orbit of the first backbone satellite and the host satellite, and directly receiving information transmitted from the host satellite at the first backbone satellite.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and their equivalents.

As described herein, a satellite network includes satellites that communicate in the network in such a manner that at least some of the satellites are difficult to detect by third parties. Transmissions from the low probability of detection satellites are performed using low power transmissions directed to neighboring satellites in the network. Transmissions to the low probability of detection satellites are made via a proxy satellite instead of the neighboring satellite.

Exemplary System Overview

Figure 1:
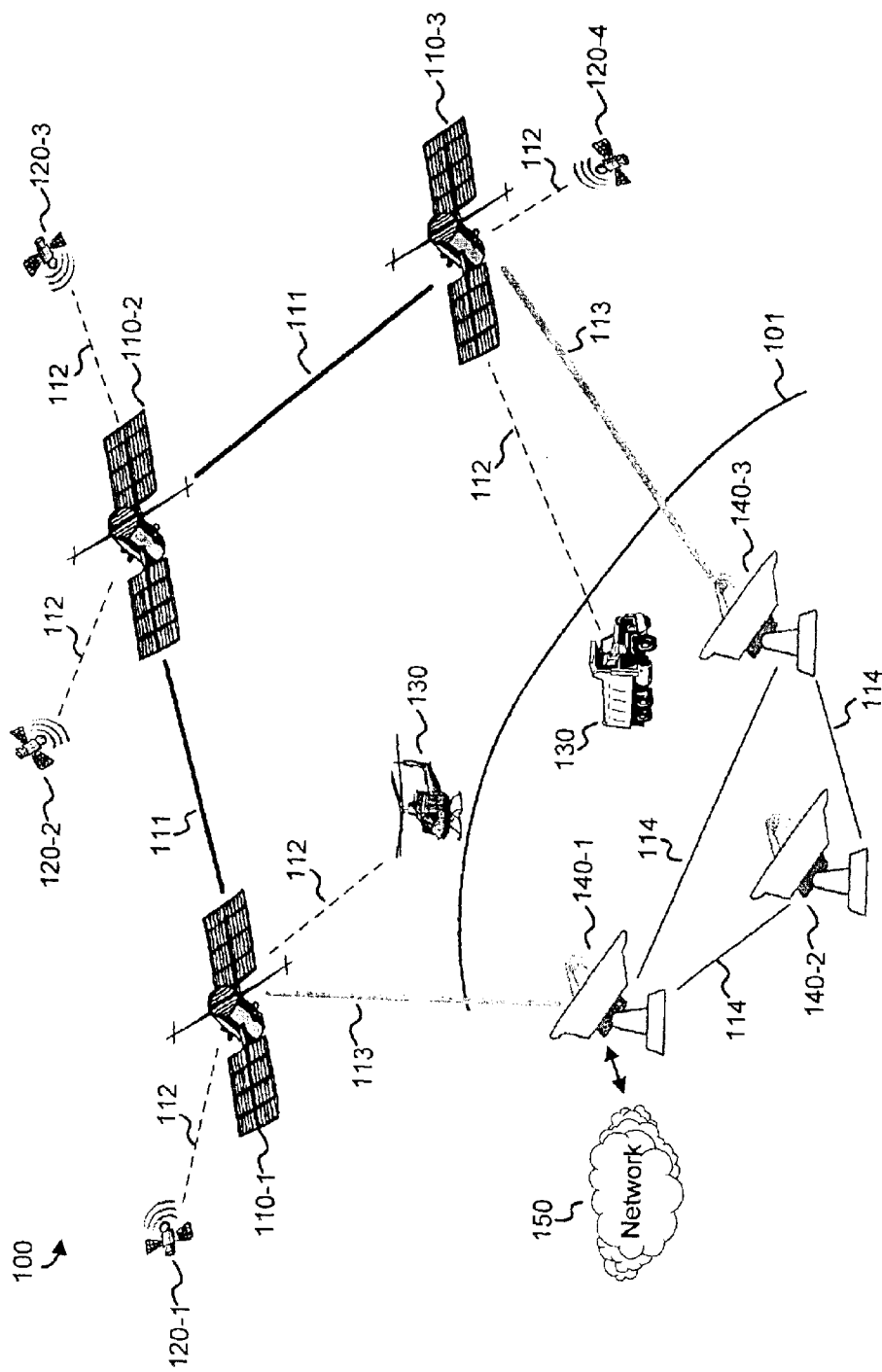
FIG. 1 is a diagram conceptually illustrating a satellite network implemented based on concepts consistent with aspects of the invention.

FIG. 1 is a diagram conceptually illustrating a satellite network 100 implemented based on concepts consistent with aspects of the invention. In FIG. 1, curved line 101 represents the edge of the Earth. Network 100 includes a number of elements that correspond to either Earth-based or space based network devices.

As shown in FIG. 1, the space-based network devices may include a number of backbone satellites 110-1, 110-2, and 110-3 (collectively backbone satellites 110), and a number of user satellites 120-1 through 1204 (collectively user satellites 120) that communicate through backbone satellites 110 to obtain network service. Although three backbone satellites 110 and four user satellites 120 are shown in FIG. 1, one of ordinary skill in the art will recognize that these numbers are for illustrative purposes only.

Backbone satellites 110 communicate with each other over inter-satellite links, labeled as links 111 in FIG. 1. These links may be implemented as optical (e.g., laser) communication links or as conventional RF links (e.g., microwave). In either case, backbone satellites 110 may use directional transmitters and receivers to communicate with one another. Directional transmitters and receivers allow backbone satellites 110 to communicate over longer distances than with omni-directional communication schemes. Directional communication schemes, however, require that each backbone satellite 110 know its location relative to another backbone satellite with which it would like to communicate so that it can point its transmitter/receiver in the correct direction. Directional communication schemes also tend to require more sophisticated transceivers than omni-directional communication schemes.

Inter-satellite links 111 may be high capacity links. For example, when implemented using radio frequency (RF) technology, they may run at 100s of megabits/second. When implemented with optical transmitters and receivers, they may run at 10s of gigabits/second.

User satellites 120 may communicate with backbone satellites 110 through access links 112 (shown in FIG. 1 as dotted lines). Access links 112 may be RF links that tend to be of lower capacity and have shorter ranges than inter-satellite links 111. Access links 112 may also be designed to only require omni-directional antennas on user satellites 120. Omni-directional antennas do not require the sophisticated pointing and tracking mechanisms that are required of directional antennas. Backbone satellites 110, in forming access links 112, may use, for example, omni-directional, patch, sectorized, or dish antennas. The particular antenna may depend on the specific services that are required. The RF communications forming access links 112 may be in a number of frequency bands, such as UHF band, L band, cellular (or GSM or PCS) bands, ISM bands (910 MHz or 2.4 GHz), or other convenient frequency bands.

Network 100, in addition to including backbone satellites 110 and user satellites 120, may also include earth-based entities. As shown in FIG. 1, earth-based entities 130 (illustratively shown as a helicopter and a truck) may interface with network 100 through access links 112 in a manner similar to user satellites 120.

Backbone satellites 110 may connect to one or more ground stations 140-1 through 140-3 (collectively ground stations 140) via up/down links 113. Up/down links 113 may include high capacity links designed for communication between a satellite and a ground terminal. Ground stations 140 may include fairly large and established ground terminals that have high capacity links designed for communications with satellites. Ground stations 140 may include, for example, large dish antennas that communicate through an RF connection with backbone satellites 110. The RF connection may run at, for example, 1 gigabit/second.

Ground stations 140 may connect to one another through standard terrestrial links, such as fiber optic links 114. One of ordinary skill in the art will appreciate that other types of terrestrial links, such as, for instance, coaxial cable, ATM, and freespace optical connections are also possible.

Ground stations 140 may also act as network gateways to other private or public networks, such as network 150. In the case of a public network, network 150 may be the Internet. In the case of a private network, network 150 may be, for example, a proprietary military or corporate network. In some cases, network 150 may include a private portion and a public portion. In general, networks 100 and 150 allow any entity that can connect to network 150 the ability to communicate through the satellite portion of the network.

Network 100 may transmit data using a packet-based transmission protocol, such as the well known Internet Protocol (IP). Under the IP protocol, each device in network 100 is associated with an IP address that uniquely identifies it from all other devices. Data sent under the IP protocol is broken into discrete data units called packets (also referred to as datagrams herein), each of which include the IP address that identifies the destination for the packet. A packet "hops" from one device to another in network 100 until it is received by its destination device.

Satellite Architecture

Figure 2:
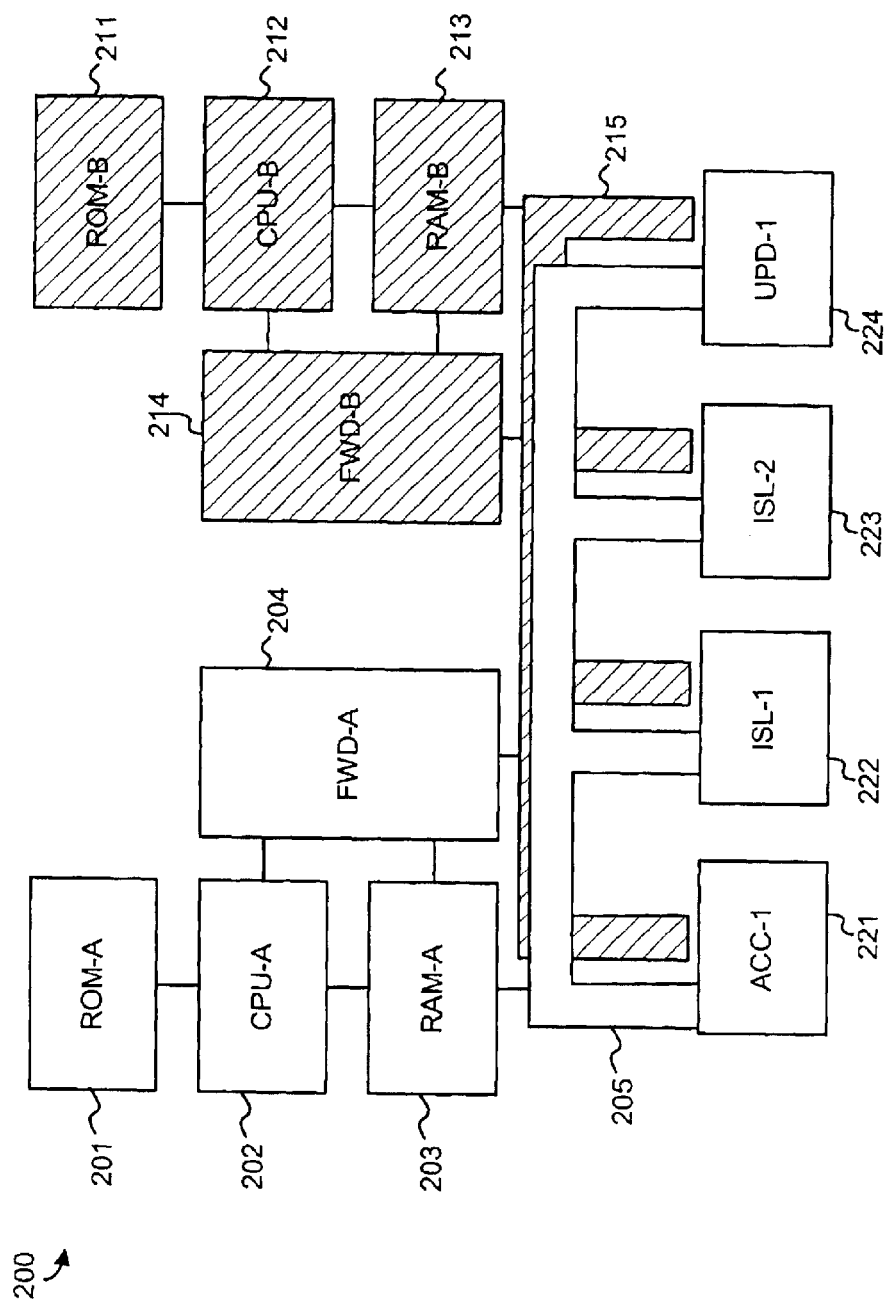
FIG. 2 is an exemplary hardware diagram of one of the satellites shown in FIG. 1.

FIG. 2 is an exemplary hardware diagram of one of backbone satellites 110, labeled as backbone satellite 200 in FIG. 2. Backbone satellite 200, as well as being a communication satellite, may act as a router in network 100.

Backbone satellite 200 may include a redundant implementation to facilitate fault tolerance. In FIG. 2, this is shown as an "A" side architecture and a "B" side architecture.

The A side architecture may include read-only-memory (ROM) 201, a processor (CPU) 202, random access memory (RAM) 203, and forwarding engine (FWD) 204. A cross-bar bus (X-BAR) 205 may connect RAM 203 and forwarding engine 204 to input/output components 221–224.

The B side architecture may be implemented in an essentially identical manner to the A side architecture and acts as a backup in case of a failure in the A side architecture. In particular, the B side architecture may include ROM 211, a CPU 212, RAM 213, and forwarding engine 214.

ROM 201 and 211 may each contain all necessary read-only storage for backbone satellite 200. ROM 201 and 211 may, for example, store programming instructions for operation of the backbone satellite, geo-locations of some or all ground stations, system identifiers, configuration parameters, etc. Although shown as single monolithic ROM devices, ROM 201 and 211 may be implemented as a mix of different types of non-volatile memory, and may even include a certain amount of reprogrammable memory as well. For instance, ROM 201 or 211 may be implemented as ROM, EEPROM, flash, etc.

CPUs 202 and 212 may be embedded processors that execute computer instructions. CPUs 202 and 212 may generally manage the control and routing functions for backbone satellite 200.

Forwarding engines 204 and 214 may each include high-speed data forwarding paths that obtain header information from packets received by backbone satellite 200, and based on the header information, may retransmit that packets on a link that leads towards the final destination of the packet. Forwarding engines 204 and 214 may include one or more forwarding tables that store information relating to packet forwarding. The forwarding tables may alternatively be stored in RAM 203 and 213. To increase processing speed, forwarding engines 204 and 214 may be implemented as FPGAs (field programmable gate arrays), ASICs (application specific integrated circuits), or other high-speed circuitry. In general, forwarding engines 204 and 214 implement many of the core routing functions of backbone satellite 200, and thus, in conjunction with their CPUs and RAMs, function as a router in the satellite. The design and implementation of routers and routing techniques is generally known in the art and will thus not be described further herein.

RAM 203 and 213 includes volatile memory in which data packets and/or other data structures may be stored and manipulated. I/O devices 221–224 may access RAM 203 and 213. RAM 203 and 213 may store queues of packets that can be read and transmitted by I/O devices 221–224.

I/O devices 221–224 contain the hardware interfaces, transceivers, and antennas (or telescopes) that implement links 111–113. ACC I/O device 211 handles access links 112. ISL I/O devices 222 and 223 handles inter-satellite links 111. UPD I/O device 224 handles up/down links 113.

Although backbone satellite 200 is shown as having four I/O devices 221–224, one of ordinary skill in the art will recognize that backbone satellite 200 could have fewer or more I/O devices. Further, multiple 110 devices, such as ISL I/O devices 222 and 223 may be operated in unison to form a single high capacity link.

User satellites 120 may include components similar to backbone satellites 110. However, user satellites 120 may not be configured to perform forwarding/routing functions in network 100 and may not include ISL I/O devices 222/223 and UPD I/O device 224. ACC I/O device 222 may be implemented using relatively simple omni-directional communication schemes.

Low Probability of Detection Network Architecture

Figure 3:
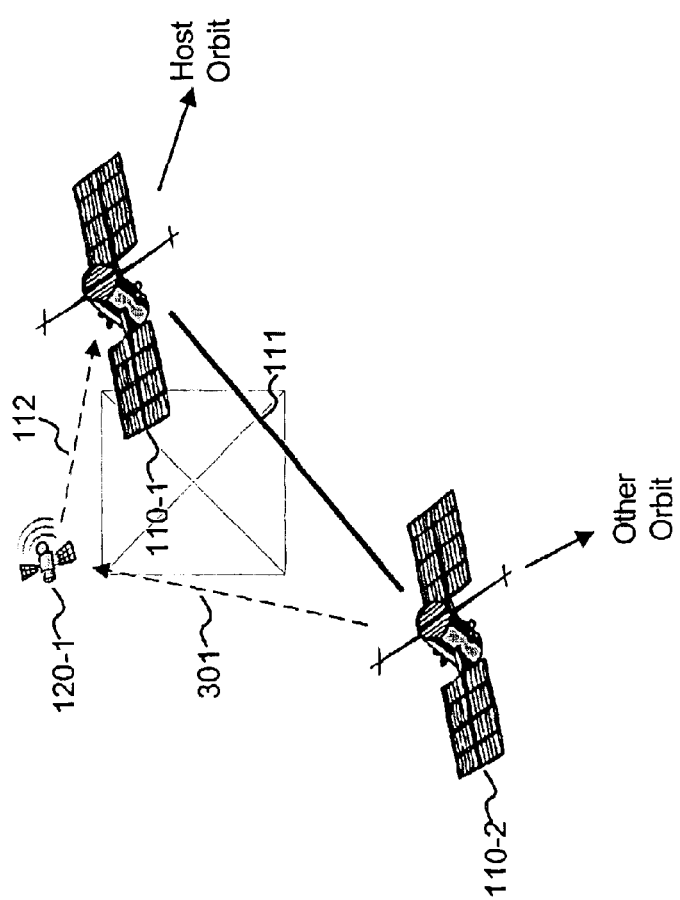
FIG. 3 is a diagram conceptually illustrating a portion of the satellite network shown in FIG. 1 operating in a low probability of detection mode.

Consistent with an aspect of the invention, user satellites 120 may operate in a low probability of detection (LPD) mode. FIG. 3 is a diagram conceptually illustrating a portion of satellite network 100 in which a user satellite 120-1 is operating in LPD mode. When operating in this mode, user satellite 120-1 will be referred to as a "host" satellite herein.

Host satellite 120-1 may be placed in the same orbit as one of backbone satellites 110, such as backbone satellite 110-1. In particular, host satellite 120-1 may be placed in the same orbit and fairly close proximity to backbone satellite 110-1. Host satellite 120-1 may communicate with network 100 by transmitting information, via an access link 112, to backbone satellite 110-1 using an omni-directional antenna. Because host satellite 120-1 is fairly close to backbone satellite 110-1, host satellite 120-1 can communicate with backbone satellite 110-1 using low-power transmissions.

A second backbone satellite, shown as satellite 110-2, may communicate with satellite 110-1 via an inter-satellite link 111. Satellite 110-2 may also transmit information to host satellite 120-1 via directional or omni-directional antennas on satellite 110-2 using an additional link, labeled as link 301 in FIG. 3.

In operation, host satellite 120-1 transmits information to backbone satellite 110-1. Backbone satellite 110-1 does not directly transmit information to host satellite 120-1. Instead, whenever backbone satellite 110-1 wishes to communicate with host satellite 120-1, it first transmits the information to backbone satellite 110-2, which forwards the information to host satellite 120-1. In this manner, backbone satellite 110-2 acts as a proxy for backbone satellite 110-1 when communicating with host satellite 120-1.

Figure 4:
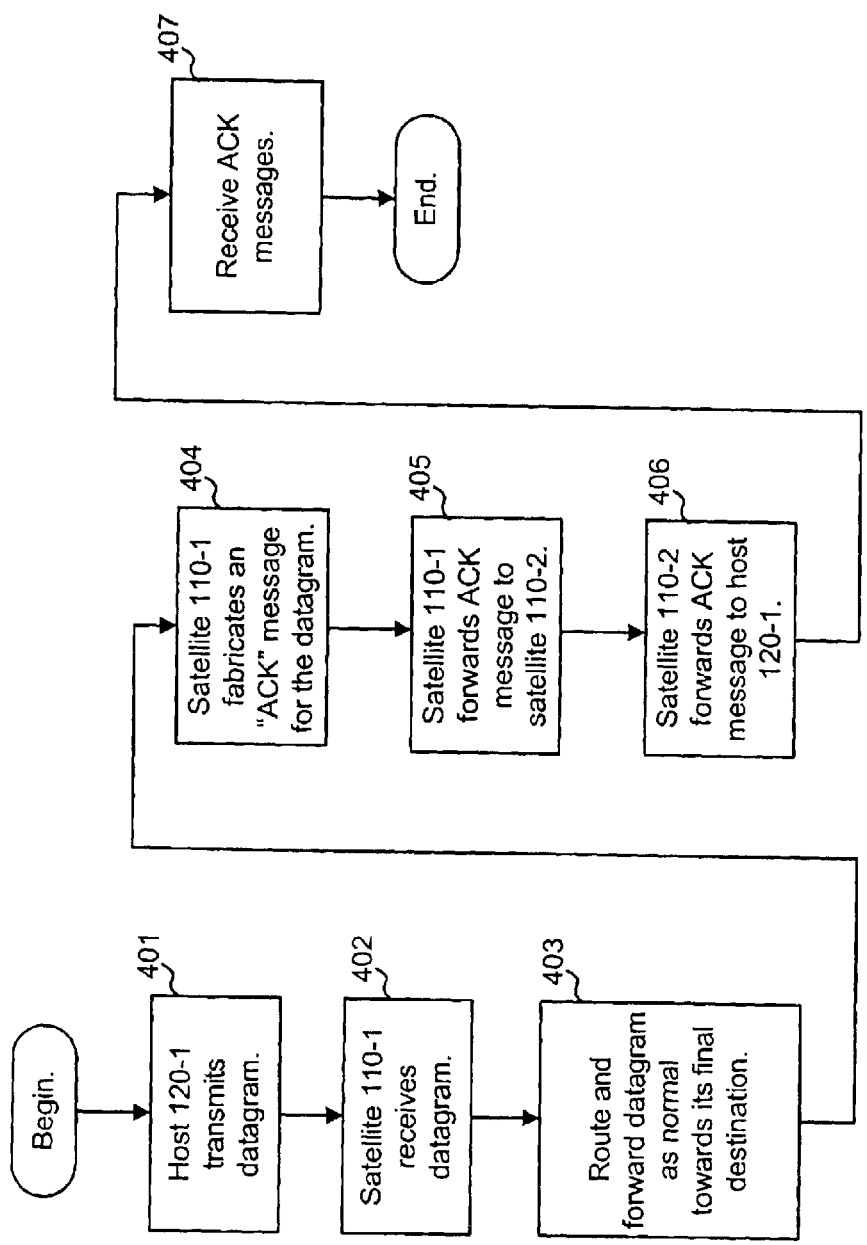
FIG. 4 is a flow chart illustrating transmission of an exemplary datagram from the host satellite shown in FIG. 3.

FIG. 4 is a flow chart illustrating transmission of an exemplary datagram (or any other unit of information) from host satellite 120-1. To begin, host satellite 120-1 transmits the datagram from its access link transceiver to access link transceiver 221 of satellite 110-1 (Act 401). Satellite 110-1 receives the datagram and forwards the datagram on its way towards its ultimate destination (Acts 402 and 403). As previously mentioned, in forwarding the datagram, satellite 110-1 may perform routing functions that determine the appropriate next hop(s) in network 100 for the datagram.

Under some protocols, satellite 110-1 may acknowledge to host satellite 120-1 that the datagram was successfully received and forwarded. In these situations, satellite 110-1 may additionally fabricate an ACK (acknowledgement) message for the datagram (Act 404). The ACK message is sent back to host satellite 120-1 via satellite 110-2. Specifically, satellite 110-1 transmits the ACK message to satellite 110-2 over inter-satellite link 111 (Act 405). The ACK message may include an indication that it should be forwarded to host satellite 120-1. Satellite 110-2 transmits the ACK message to host 120-1 via link 301 (Act 406). Host satellite 120-1 may receive the ACK message (Act 407), thus verifying that its datagram was successfully sent.

The triangular communication path defined by links 112, 111, and 301 in FIG. 3, although indirect, exhibits desirable properties for LPD communications. Host satellite 120-1 can transmit at low power since satellite 110-1 is "parked" in orbit close to host 120-1. In particular, host satellite 120-1 may be able to transmit to satellite 110-1 using a simple omni-directional antenna. For omni-directional communications, because the signal power falls away with the square of the distance in freespace, devices more distant than satellite 110-1 may have great difficulty in detecting, let alone deciphering, the transmission. Hence, the transmission from host 120-1 will be generally difficult to detect.

Additionally, transmissions from satellite 110-1 to 110-2 via inter-satellite link 111 will also be difficult to detect because they are made using directional links. Directional links between satellites will often point in directions that do not lead to the earth. Thus, communications over link 111 will also be difficult to consistently detect.

The final leg of the ACK message, from satellite 110-2 to host satellite 120-1, can also be difficult to detect. Because there may be an ever shifting set of satellites that perform the function of satellite 110-2, it can be difficult for an eavesdropper to detect the transmissions. If necessary, satellite 110-2 can take additional steps to mask its transmissions to host satellite 120-1. For example, transmissions from satellite 110-2 can be masked because satellite 110-2 may perform a number of different proxy relay transmissions for different host satellites 120-1 as satellite 110-2 follows its orbit. Transmissions from satellite 110-2 may also be masked by satellite 110-2 performing additional "nonsense" transmissions designed to obscure the real transmissions. Finally, because satellite 110-2 may use directional antennas for its transmissions to host satellite 120-1, in many cases the directional antennas will be pointing away from the earth, thus making it difficult to detect the transmissions from earth.

In summary, as described above, all transmissions from host satellite 120-1 are difficult to detect because they are sent at low power. All transmissions to host satellite 120-1 are difficult to detect because they are sent via a shifting set of proxy satellites, often via directional antennas. Satellite 110-1 can also be very hard to detect because it may only transmit on its inter-satellite link 111.

Operation of LPD Network with Full Two-Way Communication

Figure 5:
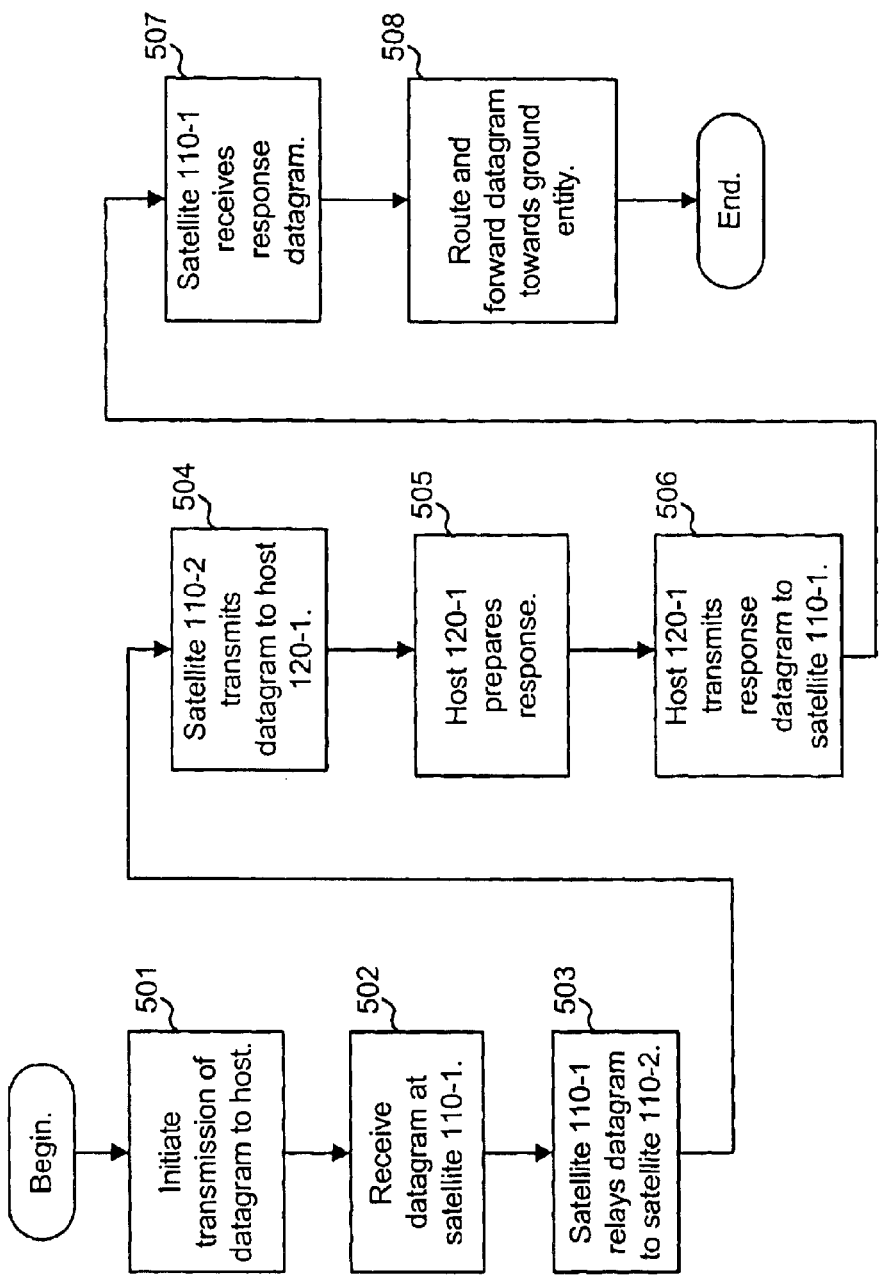
FIG. 5 is a flow chart illustrating exemplary communication between the host satellite and an earth-based entity.

FIG. 5 is a flow chart illustrating exemplary communication between host satellite 120-1 and an earth-based entity, such as an earth-based entity 130, consistent with an aspect of the invention. The earth-based entity 130 sends a datagram to host satellite 120-1 by initially injecting the datagram, addressed to host satellite 120-1, into network 100 (Act 501). The datagram is routed through network 100 on its way to host 120-1. Eventually, it will reach satellite 110-1, which is the "care of" destination for host 120-1 (Act 502).

Satellite 110-1 relays the datagram to satellite 110-2, with instructions to relay the datagram to host 120-1 (Act 503). In response, satellite 110-2 forwards the datagram to host 120-1 (Act 504). Host 120-1 may prepare a response to the datagram (Act 505) and transmit the response to satellite 110-1 (Act 506). As previously mentioned, the transmission to satellite 110-1 may be made through a low power omni-directional link. Satellite 110-1 receives the response from host 120-1 and forwards the response to a next hop on the way to earth-based entity 130 (Acts 507 and 508).

Figure 6:
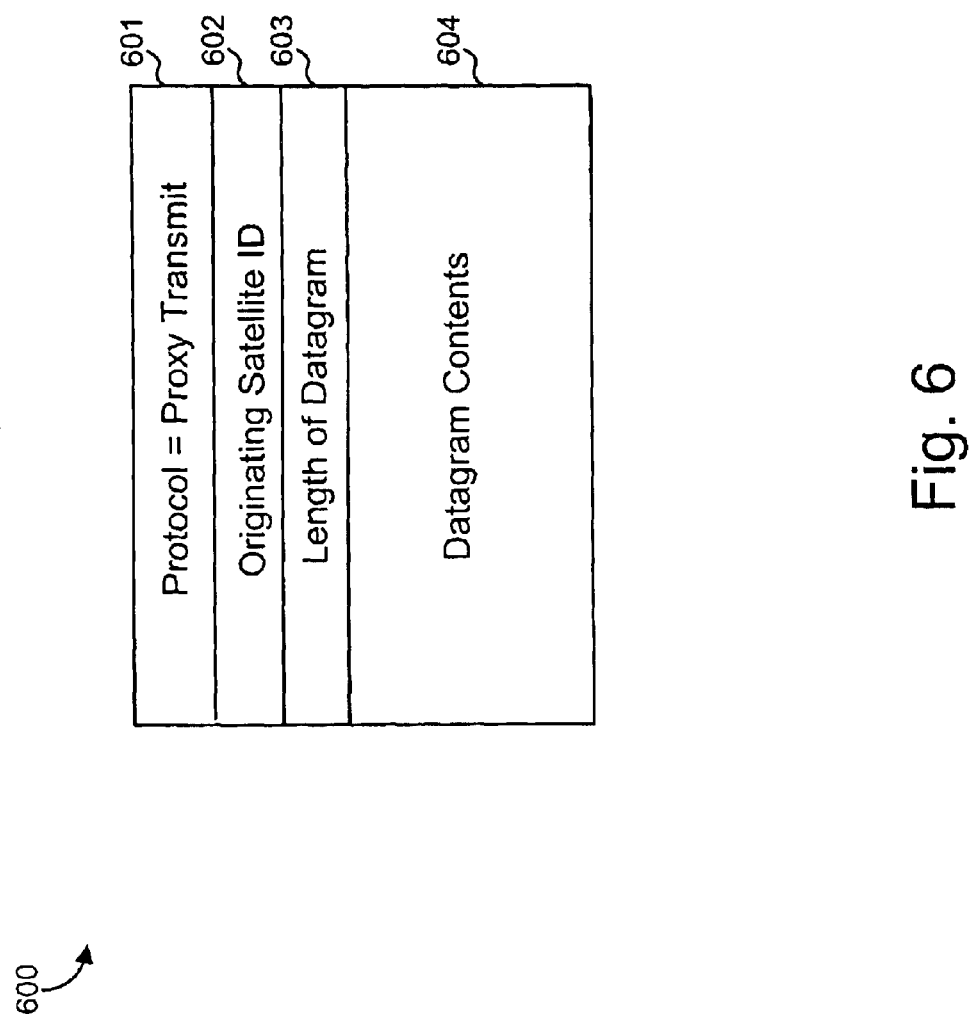
FIG. 6 is a diagram illustrating a possible format of a datagram under a protocol that supports proxy transmissions.

In acts 501-508, satellite 110-2 acts as a proxy for satellite 10-1. Consistent with an aspect of the present invention, satellite 110-2 may act as a proxy for satellite 110-1 by implementing a protocol in network 100 that supports such proxy transmissions. FIG. 6 is a diagram illustrating a possible format of a datagram under such a protocol. As illustrated, datagram 600 may include a number of exemplary fields, including, for example, protocol field 601, originating satellite identification field 602, length of datagram field 603, and datagram content field 604.

Protocol field 601 indicates the protocol under which the encapsulated information is being transmitted. In this example, the protocol is "Proxy Transmit," which indicates that a proxy satellite is being used to relay a datagram to its final destination. Originating satellite identification field 602 identifies the satellite requesting the proxy transmit service. In the examples discussed previously, satellite 110-1 is requesting the proxy transmit service.

Length of datagram field 603 indicates the length of the encapsulated information. Datagram contents field 604 contains the contents of the original datagram before fields 601–603 were appended to the datagram to implement the "proxy transmit" protocol. In the context of FIG. 5, satellite 110-1 may append fields 601–603 to the original datagram.

Upon receipt of datagram 600, satellite 110-2 may point a directional transceiver towards the direction of satellite 110-1 (and hence, also towards host 120-1). Satellite 110-2 may then optionally determine the transmit power required to transmit datagram 600 to host 120-1, and finally, satellite 110-2 may transmit datagram 600 to host 120-1.

Consistent with aspects of the invention, an alternate technique may be used through which satellite 110-2 may act as a proxy for satellite 110-1. This technique, although slightly more complex, reduces the inefficiency potentially caused by transmitting the datagram from satellite 110-2 to satellite 110-1 and then back to satellite 110-2. Instead, satellite 110-2 is given sufficient information so that it knows how to directly handle the transmission of the datagram to host 120-1.

Figure 7:
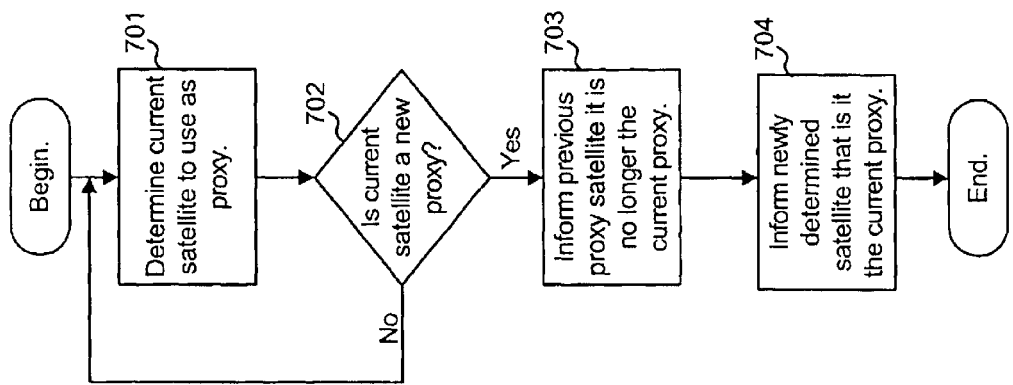
FIG. 7 is a flow chart illustrating operations performed consistent with an alternate technique for using proxy satellites.

FIG. 7 is a flow chart illustrating operations performed consistent with this alternate technique for using proxy satellites. Satellite 110-1 may determine the current satellite to use as its proxy satellite (Act 701). The current satellite may be, for example, the backbone satellite closest to satellite 110-1 with which a communication link can be formed. Assume that satellite 110-2 is determined to be the current proxy satellite. If satellite 110-2 is a new proxy satellite, satellite 110-1 sends a message to the previous proxy satellite informing it that is no longer the current proxy satellite (Acts 702 and 703). Additionally, satellite 110-1 informs satellite 110-2 that it is to act as the proxy for satellite 110-1 (Act 704).

Satellite 110-2, when it is designated as the proxy satellite for satellite 110-1, examines incoming datagrams to determine if they are destined for a host satellite near satellite 110-1. If so, instead of first forwarding the datagram to satellite 110-1, satellite 110-2 sends the datagram directly to the host.

Figure 8:
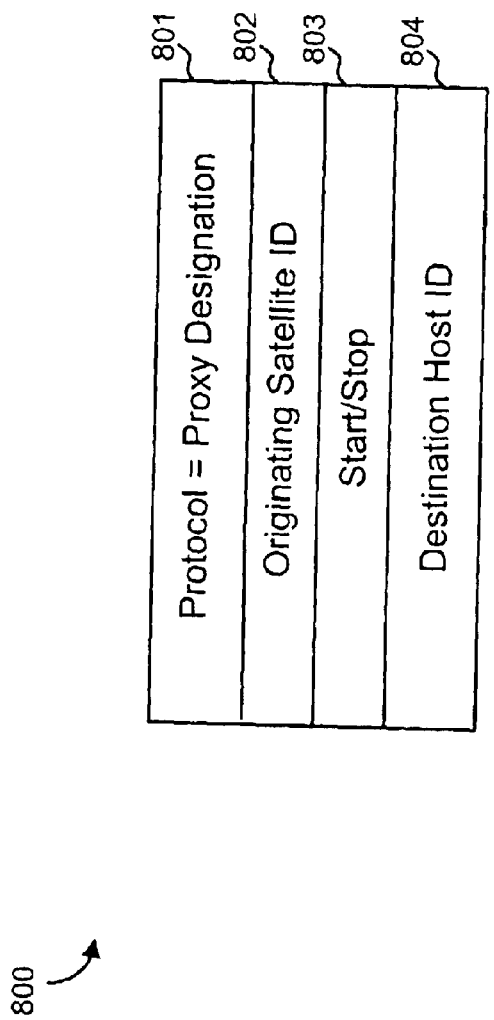
FIG. 8 is a diagram illustrating a possible format for a message that a satellite uses to initiate or stop proxy transmission services.

FIG. 8 is a diagram illustrating a possible format for a message that satellite 110-1 uses to start/start proxying as described above with reference to FIG. 7. Message 800 includes a number of fields, including protocol designation field 801, originating satellite identification field 802, start/stop field 803, and destination host identification field 804.

Protocol designation field 801 indicates that message 800 is a "proxy designation" message. Originating satellite identification field 802 identifies the satellite requesting the new proxy designation. Start/stop field 803 indicates whether the receiving satellite is to start acting as a proxy or stop acting as a proxy. Destination host identification field 804 identifies the host satellite, e.g., host 120-1, to which the proxying applies.

In response to messages, such as message 800, proxy satellites, such as proxy satellite 110-2, may maintain an internal "proxy table" that contains a list of all destination hosts for which they are currently acting as a proxy, together with the relevant "nearby" satellite for each of these hosts.

Figure 9:
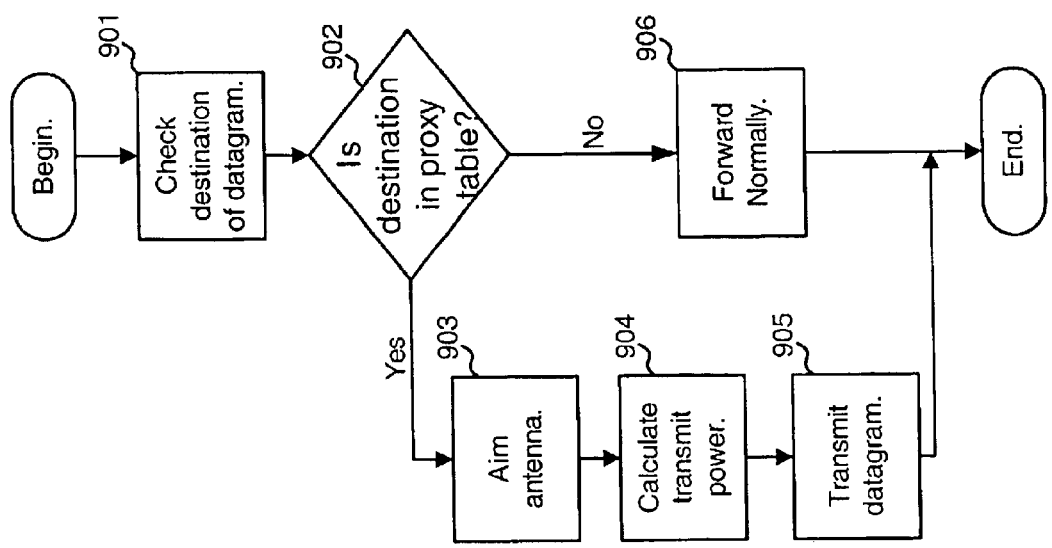
FIG. 9 is a flow chart illustrating operations consistent with aspects of the present invention that are performed by a proxy satellite when forwarding a datagram.

FIG. 9 is a flow chart illustrating operations consistent with aspects of the present invention that a proxy satellite performs when forwarding a datagram. The proxy satellite may begin by checking the destination of the datagram (Act 901). If the destination is listed in the proxy table as a current host, the proxy satellite may aim its antenna towards the relevant "nearby" backbone satellite for this host (Acts 902 and 903). The proxy satellite may then optionally determine the transmit power required to transmit the datagram to the host (Act 904). Finally, the proxy satellite may transmit the datagram (Act 905).

CONCLUSION

A satellite network provides communication services to one or more host satellites in such a manner that the host satellites are difficult to detect by parties not involved with the satellite network. Communications from such host satellites are performed using low power, possibly omni-directional, transmission schemes to satellites in a nearby orbit. Communications to the host satellites are relayed from the nearby satellite to a proxy satellite that transmits to the host satellite. The communication links between the proxy satellite and the host satellite and between the nearby satellite and the proxy satellite may be made using directional connections, which are difficult to detect outside of the line of site of the directional path.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the present invention is not limiting of the present invention. Thus, the operation and behavior of the aspects were described without reference to the specific software code or hardware logic. It should be understood that a person of ordinary skill in the art would be able to design software and control hardware to implement the aspects of the present invention based on the description herein.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, although the term "satellite" was primarily described herein to refer to a device orbiting the Earth, such devices could also orbit other celestial bodies, such as the Moon or Mars.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed:

1. A satellite system comprising:
   a first backbone satellite orbiting in a first orbit; and
   a host satellite orbiting in the first orbit and configured to be physically near the first backbone satellite, the host satellite transmitting information directly to the first backbone satellite via an omni-directional communication scheme and receiving information from the first backbone satellite via a proxy satellite through which the information is relayed.

2. The satellite system of claim 1, wherein the proxy satellite is a second backbone satellite orbiting in an orbit different than the first orbit.

3. The satellite system of claim 2, wherein the first backbone satellite includes:
   inter-satellite input/output devices configured to form directional links between the first backbone satellite and the second backbone satellite.

4. The satellite system of claim 3, wherein the host satellite includes:
   access input/output devices configured to form omni-directional links between the host satellite and the first backbone satellite.

5. The satellite system of claim 1, wherein the proxy satellite receives the information from the first backbone satellite over a directional communication link.

6. The satellite system of claim 5, wherein the proxy satellite forwards the information from the first backbone satellite to the host satellite.

7. The satellite system of claim 6, wherein, when forwarding the information from the first backbone satellite, the proxy satellite:
   determines a power requirement for forwarding the information to the host satellite, and
   transmits the information to the host satellite based on the determined power requirement.

8. A first backbone satellite comprising:
   a first input/output device configured to receive communications from a host satellite using omni-directional radio frequency links; and
   a second input/output device configured to transmit communications ultimately destined for the host satellite using directional communication links aimed at a second backbone satellite, the second backbone satellite configured to relay the communications ultimately destined for the host satellite to the host satellite.

9. The satellite of claim 8, wherein the first backbone satellite orbits in a same orbit as an orbit of the host satellite.

10. The satellite of claim 8, wherein the second backbone satellite orbits in an orbit different than an orbit of the host satellite.

11. The satellite of claim 8, wherein the first backbone satellite designates the second backbone satellite as a proxy.

12. A host satellite in a satellite network, the host satellite comprising:
    means for transmitting information to a destination in the satellite network by broadcasting the information to a first backbone satellite located proximate to the host satellite and traveling in a same orbit as the host satellite; and
    means for receiving information from a second backbone satellite that is traveling in a different orbit than the orbit of the host satellite.

13. The satellite of claim 12, wherein the means for transmitting includes an omni-directional antenna.

14. The host satellite of claim 12, wherein the host satellite transmits the information at a power level that is low enough such that there is a low probability of detection of the host satellite.

15. A method of communicating with a low probability of detection in a satellite system, the method comprising:
    receiving information, intended for a host satellite, at a first backbone satellite that is located proximate to and in a same orbit as the host satellite;
    forwarding the information to the host via a second backbone satellite that is in an orbit different from the orbit of the first backbone satellite and the host satellite; and
    directly receiving information transmitted from the host satellite at the first backbone satellite.

16. The method of claim 15, wherein directly receiving the information at the first backbone satellite includes receiving the information transmitted from an omni-directional antenna of the host satellite.

17. The method of claim 16, wherein the information transmitted from the omni-directional antenna is transmitted at a signal power low enough such that there is a low probability of detection of the transmitted information by devices not located proximate to the host satellite.

18. The method of claim 15, wherein forwarding the information further includes:
    forwarding the information to the second backbone satellite over a directional communication link.

19. The method of claim 15, wherein forwarding the information further includes:

designating the second backbone satellite as a proxy for the first backbone satellite.

20. The method of claim 19, wherein, when the second backbone satellite is designated as the proxy, the second backbone satellite routes information that is indicated as being destined to the host satellite via the first backbone satellite directly to the host satellite.

21. A method, implemented in a backbone satellite, comprising:

determining a current satellite to use as a proxy for transmitting information to a host satellite;

informing a previous satellite that was being used as the proxy that the previous satellite is no longer the proxy; and informing the current satellite that the current satellite is to act as the proxy for the backbone satellite to forward information ultimately intended for the host satellite directly to the host satellite.

22. The method of claim 21, further comprising:

forming a communication link between the backbone satellite and the host satellite through which the host satellite transmits information.

23. The method of claim 21, wherein the communication link between the backbone satellite and the host satellite is an omni-directional communication link.

24. The method of claim 21, wherein the backbone satellite is in a same orbit as the host satellite.

* * * * *